United States Patent
Nam et al.

(10) Patent No.: US 8,124,298 B2
(45) Date of Patent: Feb. 28, 2012

(54) METHOD OF FABRICATING A CHROMIUM NITRIDE COATED SEPARATOR

(75) Inventors: Dae Geun Nam, Seoul (KR); Hu Chul Lee, Seoul (KR)

(73) Assignee: Seoul National University Industry Foundation (KR)

( * ) Notice: Subject to any disclaimer, the term of this patent is extended or adjusted under 35 U.S.C. 154(b) by 944 days.

(21) Appl. No.: 11/996,691

(22) PCT Filed: Dec. 7, 2006

(86) PCT No.: PCT/KR2006/005267
§ 371 (c)(1),
(2), (4) Date: Jan. 24, 2008

(87) PCT Pub. No.: WO2008/038858
PCT Pub. Date: Apr. 3, 2008

(65) Prior Publication Data
US 2010/0143825 A1     Jun. 10, 2010

(30) Foreign Application Priority Data
Sep. 28, 2006  (KR) .................. 10-2006-0094649

(51) Int. Cl.
*H01M 2/32* (2006.01)
*H01M 8/02* (2006.01)
(52) U.S. Cl. ............... 429/522; 429/520; 429/400
(58) Field of Classification Search .............. None
See application file for complete search history.

(56) References Cited

U.S. PATENT DOCUMENTS

| | | | | |
|---|---|---|---|---|
| 5,116,430 A | * | 5/1992 | Hirai et al. | 148/518 |
| 2003/0190515 A1 | * | 10/2003 | Brady et al. | 429/34 |
| 2004/0038108 A1 | * | 2/2004 | Kaiser et al. | 429/34 |
| 2004/0048134 A1 | | 3/2004 | Kihira et al. | |
| 2005/0202302 A1 | | 9/2005 | Uchiyama et al. | |
| 2006/0040165 A1 | | 2/2006 | Uchiyama et al. | |
| 2006/0110648 A1 | | 5/2006 | Lee et al. | |

FOREIGN PATENT DOCUMENTS

| | | | |
|---|---|---|---|
| JP | 11162478 A | | 6/1999 |
| JP | 2000353531 A | * | 12/2000 |

* cited by examiner

*Primary Examiner* — Keith Walker
(74) *Attorney, Agent, or Firm* — Hoffman & Baron, LLP

(57) ABSTRACT

Provided are a metallic separator for fuel cell in which a $Cr_2N$ layer is formed on the surface of base metals, and a method of fabricating the metallic separator or fuel cell. The method comprises: plating chromium layer on the surface of the base metal; and forming a $Cr_2N$ layer by nitriding the chromium-plated layer in properly selected nitriding conditions. Only the $Cr_2N$ layer, which has lower electrical resistivity than CrN, is selectively fabricated on the surface of the base metal. The interfacial contact resistance of the separator is reduced and the efficiency of the fuel cell can be improved. In addition, since a low-priced general metals or alloys such as stainless steels, carbon steels, alloy steels or even nonferrous alloys can be used as the base metal, the cost of the fabrication of metallic separator can be significantly reduced. The thickness of the separator can be made as small as to 0.2 mm, the weight and total thickness of a fuel cell stack can be significantly reduced.

8 Claims, 5 Drawing Sheets

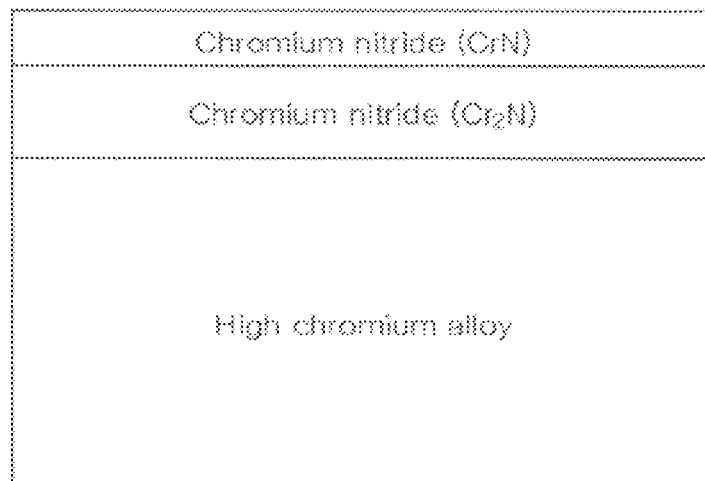
[Fig. 1]
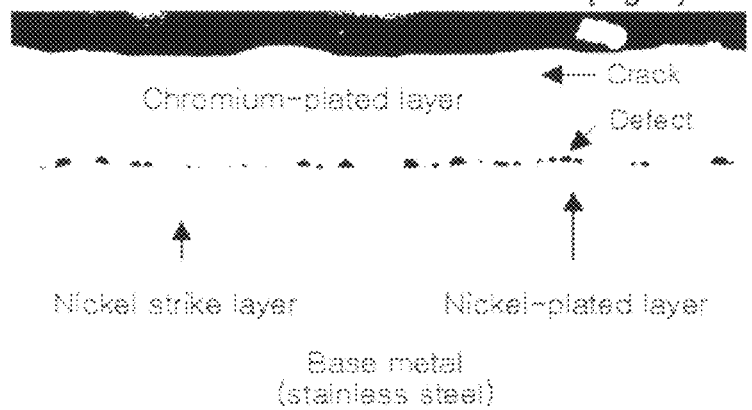
[Fig. 2]
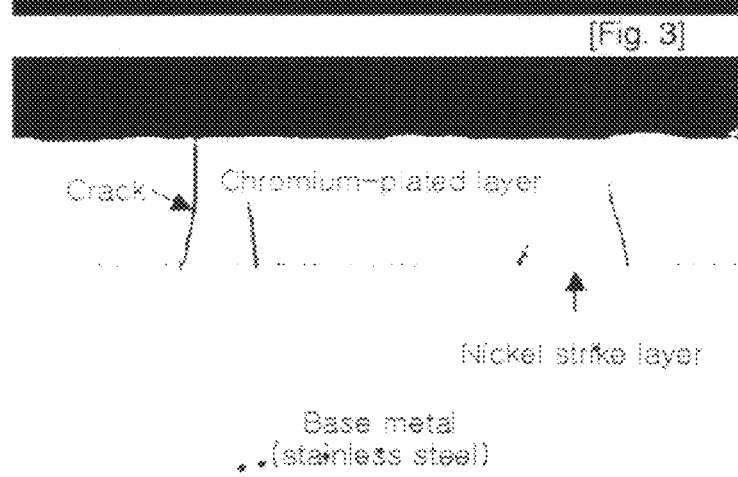
[Fig. 3]

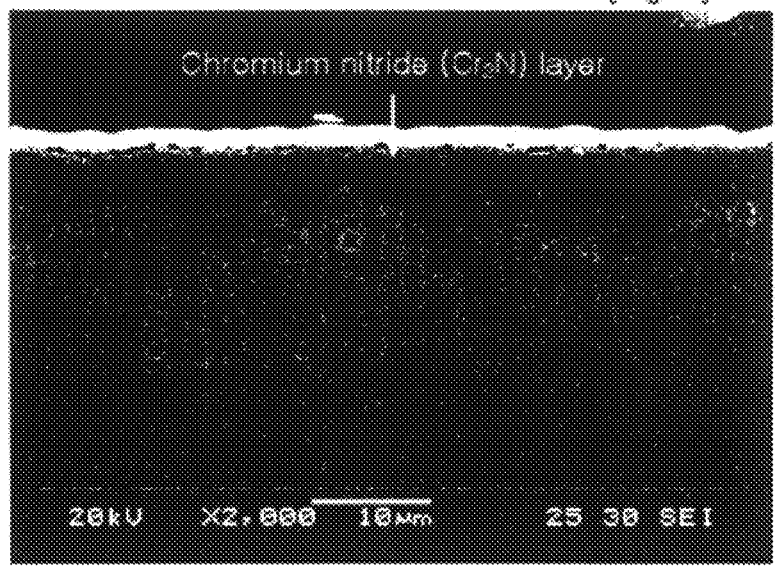
[Fig. 4]
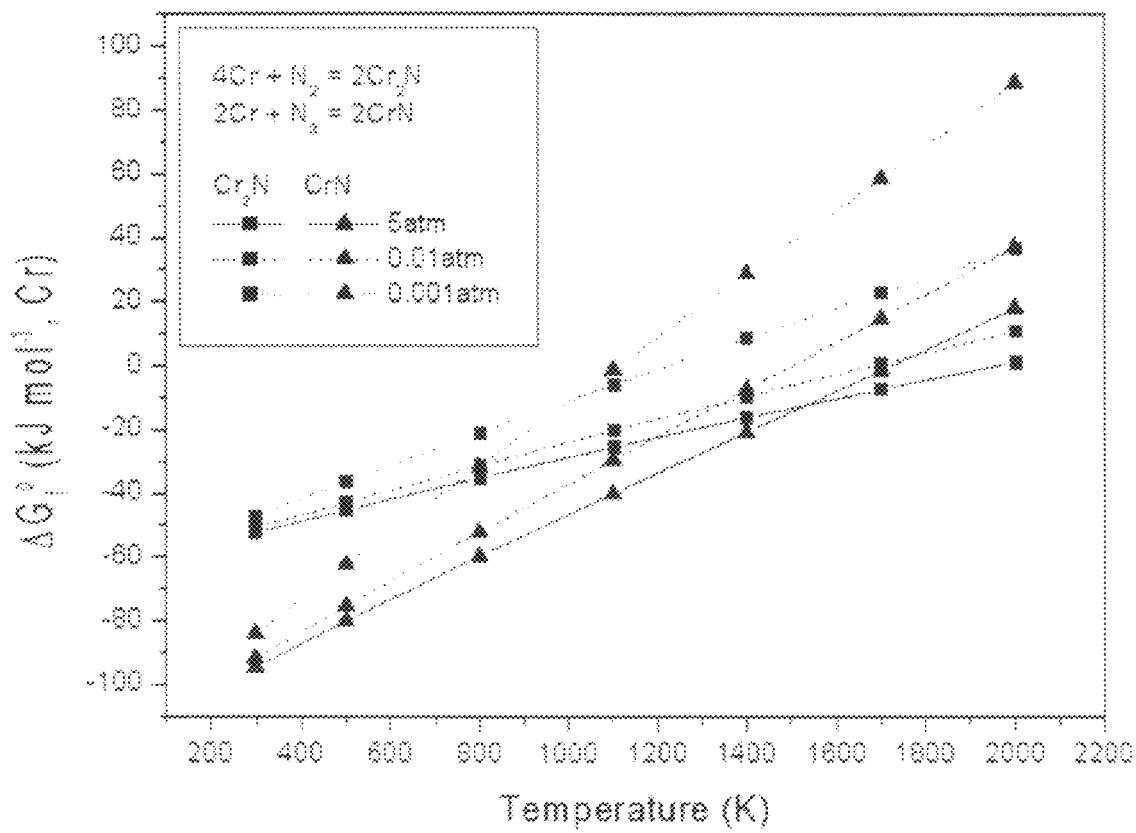
[Fig. 5]

[Fig. 6]
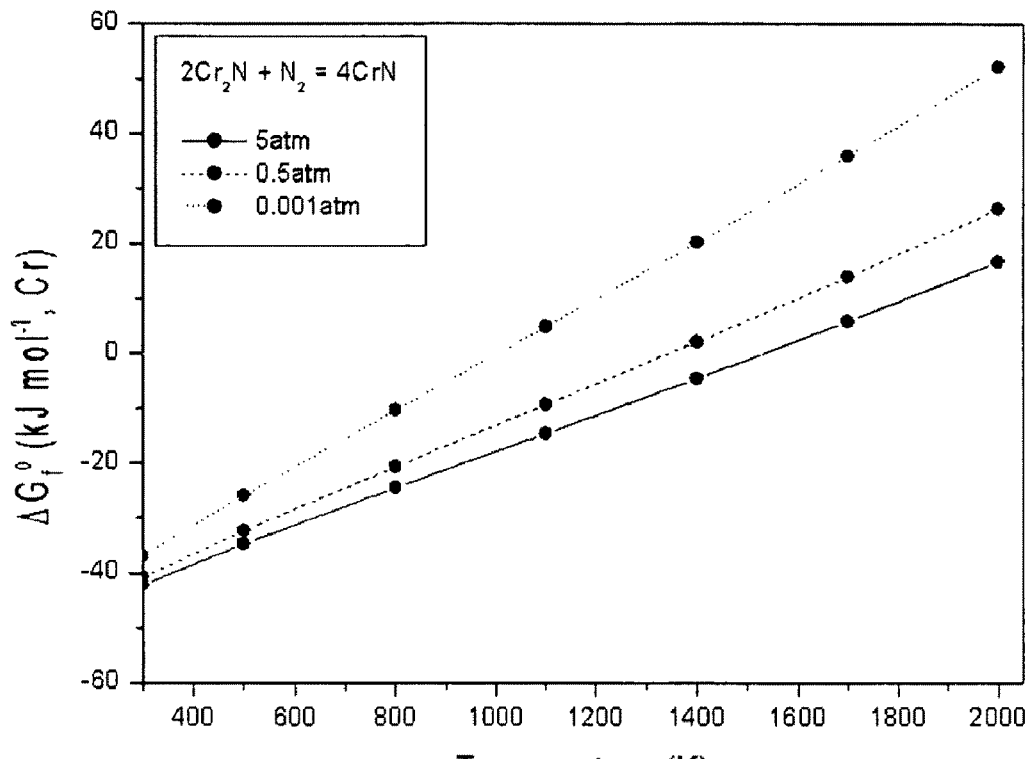
[Fig. 7]
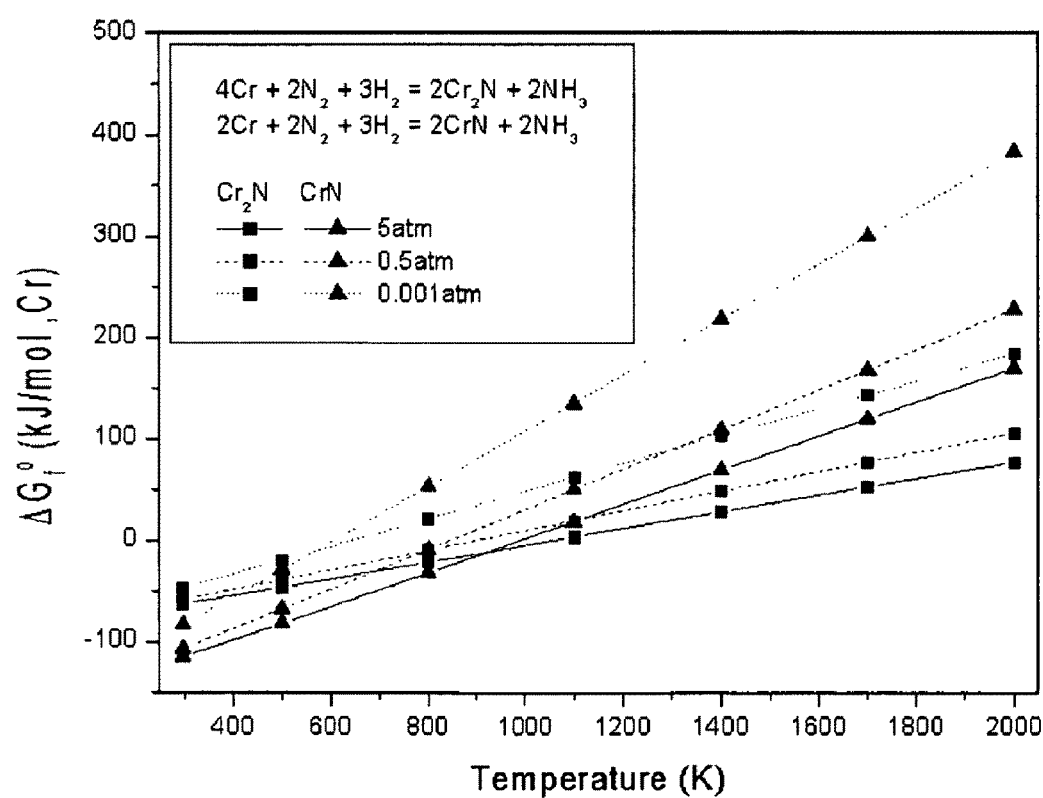

[Fig. 8]
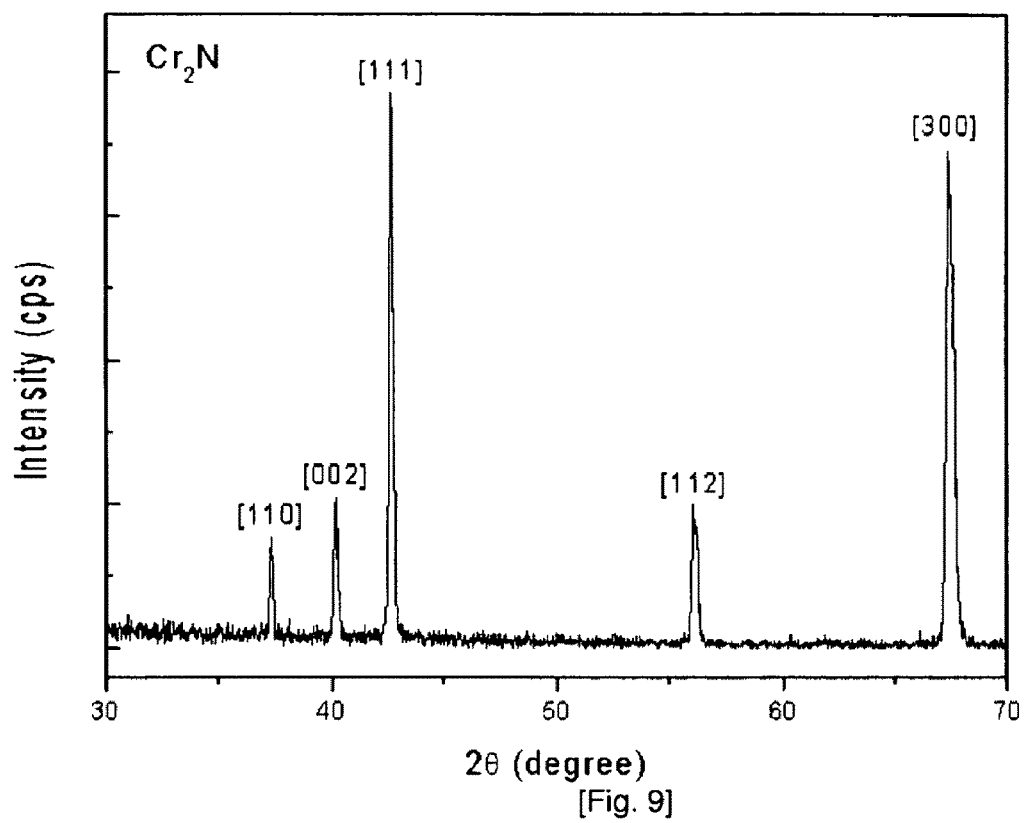
[Fig. 9]
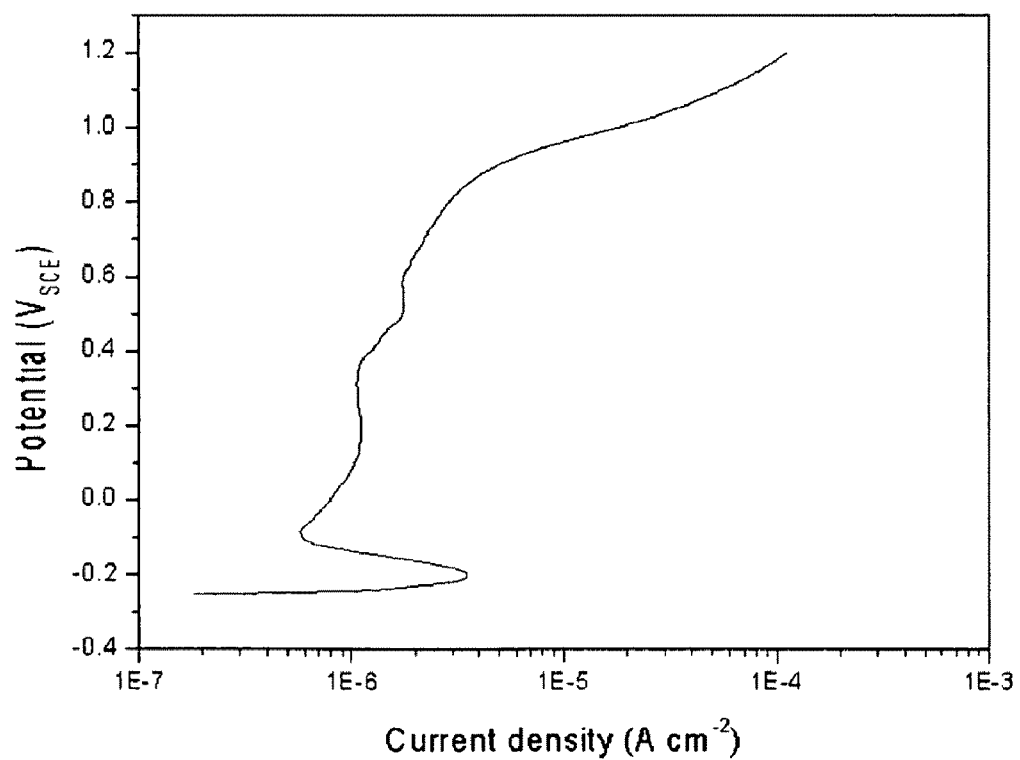

[Fig. 10]
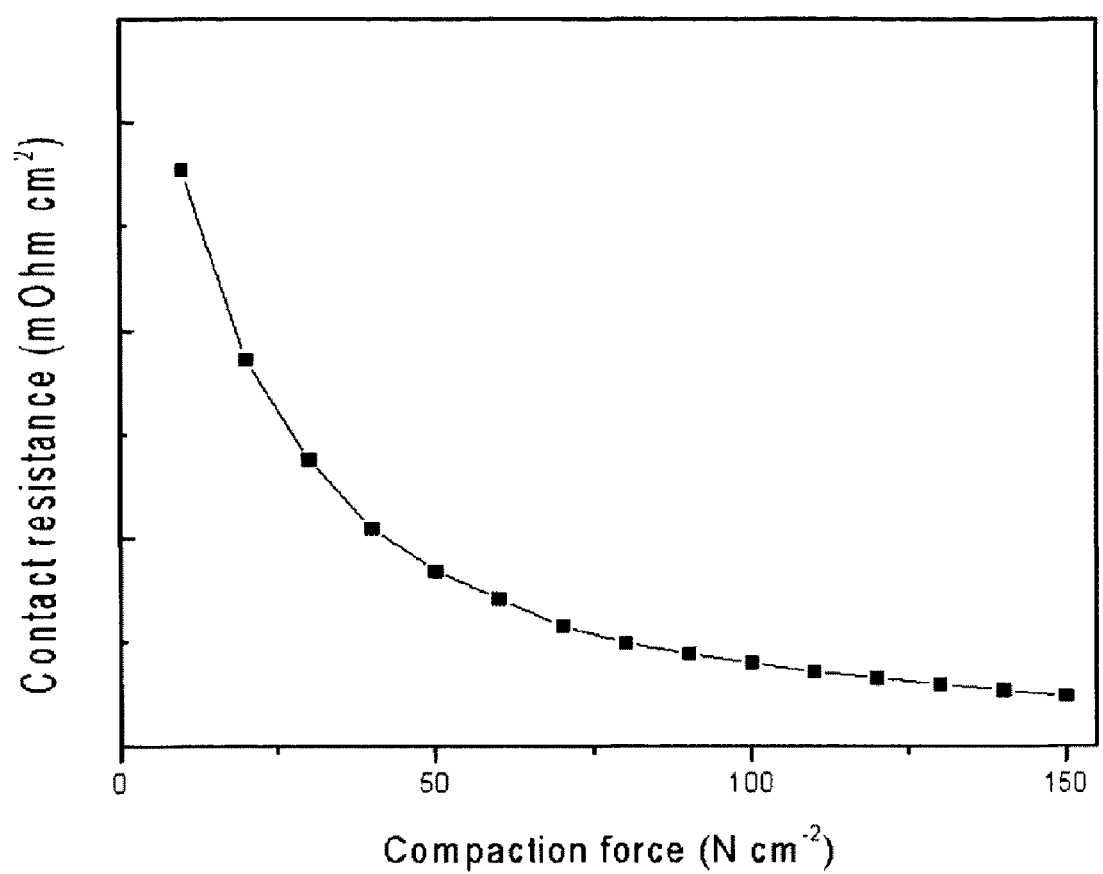

METHOD OF FABRICATING A CHROMIUM NITRIDE COATED SEPARATOR

TECHNICAL FIELD

The present invention relates to a separator for a fuel cell, and more particularly, to a metallic separator for a fuel cell in which chromium nitride layer is fabricated on the surface of a metallic base material, and a method to fabricate the same.

BACKGROUND ART

In these days, the importance of the development for fuel cells, which use hydrogen for power generation, is on the increase. Use of fuel cell can not only replace the depleting fossil fuels but also prevents environmental woes such as global warming caused by excessive generation of carbon dioxide. Fuel cells also have various advantages to satisfy the environmental and technical demands. Fuel cells directly convert a chemical energy into an electric energy using hydrogen as a fuel. Because energy efficiency is high and only water is the reaction product as an exhaust material, fuel cell technology is an eco-friendly energy technology.

The operating mechanism of a fuel cell starts from production of electrons and hydrogen ions (protons) by oxidizing a fuel such as hydrogen, natural gas, and methanol on the anode side. Protons generated on the anode side move to the cathode side through an electrolyte membrane, and electrons generated on the anode side are supplied to an external circuit through a separator. The protons combine with oxygen supplied to the inside of the fuel cell as oxidant and produce water.

Fuel cells may be classified into several categories, a polymer electrolyte membrane fuel cell (PEMFC), a phosphoric acid fuel cell (PAFC), a molten carbonate fuel cell (MCFC), and a solid oxide fuel cell (SOFC), according to the type of electrolyte used. Operating temperature and materials for the components vary with the type of fuel cell.

A polymer electrolyte (proton exchange) membrane fuel cell may operate at a relatively low temperature of about 80-120° C. and may have a high power density and thus may be used as a power source fix automobiles and homes. Such a PEMFC includes a stack having multiple unit cells separated by a plate called separator. Each unit cell comprises electrolyte as a polymer ion exchange membrane which is inserted between the two catalyst electrodes. The electromotive fierce of one unit cell is only several hundreds mV (in the case of a unit cell conventionally used, about 700 mV) and, when a fuel cell is actually used in a device, hundreds of serial unit cells need to be stacked. Due to their advantages ci fuel cells, many researches and developments have been made over the last decade, and prototype fuel cells have been produced. However, previously produced fuel cells are very expensive and wide use of them in industry is limited. For the general application of fuel cells in industries, the manufacturing cost should be reduced through the component development and component price reduction. In a stack of a fuel cell, separator is an important component and takes a weight ratio of about 80% and a price ratio of about 40% of the stack. Development of a low-priced and light weighted separator is essential for the wide application of fuel cells in industries and private homes.

A separator serves as a blocking plate between the unit cells, contacts a membrane electrode assembly (MEA), and transmits electricity generated in a unit cell. Since the inside of a unit cell is in a corrosive environment, the separator has to have good corrosion resistance and the resistivity of the surface of the separator that contacts the MEA should be low for good electric efficiency. In addition, since the number of separators used in one fuel cell stack is several hundreds, it is preferable to fabricate the separator as thin as possible to make the entire stack compact.

At present, graphite is generally used as the separator material for fuel cell, and hydrogen and air paths are formed in the separator by molding or milling. The graphite separator has advantages of good electrical conductivity and good corrosion resistance. However, due to the high cost of the graphite material itself and high processing cost of a plate, the price of the separator is very high. In addition, since the graphite separator is fragile, it is not easy to process the graphite separator to a thickness of 4-5 mm or below. Thus, it is difficult to reduce the size of a fuel cell stack consisting of several tens to several hundreds of unit cells to a desirable dimension.

As an alternative for graphite separator materials, many attempts were made to use metals for separator materials. Metals have many properties required for the separator and have advantages of low material and processing costs. However, metals can corrode in oxidative environment inside the stack and oxide films that have large electrical resistivity can easily form on the surface of the metallic separator. Problems such as membrane poisoning or an increase of contact resistance can occur. Corrosion of metallic separator can cause the formation of defects in the metallic separator and the poisoning of catalyst and electrolyte by the diffusion of metallic ions into the electrolyte membrane. When the catalyst is poisoned, the activity of the catalyst is degraded, and, when the electrolyte is poisoned, the ion conductivity of the electrolyte is degraded. The performance of the fuel cell will also be degraded. In addition, because the corroded metal is in contact with the MEA, interfacial contact resistance (ICR) increases and the performance of the fuel cell will be further aggravated.

Such a corrosion problem is the largest obstacle for the application of the metallic separator. In order to improve the corrosion resistance of the separator, surface treatment of high chromium alloys and precious metals has been attempted. In general, surface treatment often performed to improve the surface characteristics of materials. Surface treatment includes the forming a film or making a chemically stable compound on to the surface of base metals.

When a chromium nitride layer is coated on the surface of the high chromium alloy steels, the corrosion characteristics of the material can be improved. However, the cost of high chromium alloy steel can be very high and the corrosion resistance of the coated layer is not sufficient for fuel cell. In case of forming chromium nitride layers on chromium steels, two types of compounds can form and their physical properties are quite different. CrN, $Cr_2N$, or both of the nitrides can form depending on the nitriding condition, such as temperature and nitrogen partial pressure. Chromium nitride layer formed on the surface of a high chromium alloy is demonstrated in FIG. 1. Both types of the chromium nitrides were formed. The electrical resistivity of CrN compound is very high, 10 times higher than that of $Cr_2N$ compound. It is very much favorable only to form a chromium nitride, $Cr_2N$, which has better electrical properties, on the metallic separator.

DISCLOSURE OF INVENTION

Technical Problem

The present invention provides a metallic separator for a fuel cell, which costs less and smaller thickness compared to a graphite separator.

The present invention also provides a metallic separator for a fuel cell, which costs less and has improved physical properties compared to the conventional high chromium alloy steel.

Technical Solution

The present invention provides a metallic separator for a fuel cell in which a $Cr_2N$ layer is formed on a surface of a base metal.

The base metal may be one of metals selected from the group consisting of stainless steels, carbon steels, alloy steels, and metal alloys.

A nickel strike layer may be formed between the base metal and the chromium plated layer which will be nitrided.

According to another aspect of the present invention, a method of fabricating a metallic separator in which a $Cr_2N$ layer is formed on the surface of the base metal is provided. The method includes: plating chromium on the surface of the base metal; and forming a $Cr_2N$ layer on a chromium-plated layer by adjusting the nitriding condition.

The method may further include the nickel strike process before the plating of chromium on the surface of the base metal, if a passive film (an oxide layer) exists on the surface of the base metal.

A nitrogen partial pressure may be set to 0.001-5 atm during nitriding process.

A partial pressure of a mixed gas in which hydrogen is added to nitrogen, may be set to 0.001-5 atm during the nitriding treatment.

The method may further include rapidly cooling the separator so as not to form CrN compound during the cooling process after nitridization.

BRIEF DESCRIPTION OF THE DRAWINGS

FIG. 1 is a schematic view of the cross-section of conventionally processed chromium nitride layer on high chromium steel.

FIG. 2 illustrates a photographic image showing a cross-section of a separator, in which conventional nickel strike, nickel and chromium are sequentially plated on the surface of stainless steel;

FIG. 3 illustrates a photographic image showing a cross-section of a separator, in which nickel strike and chromium are sequentially plated on the surface of stainless steel according to the present invention;

FIG. 4 illustrates a photographic image showing a cross-section of a material in which a chromium nitride ($Cr_2N$) is formed on the surface of chromium plated stainless steel according to the present invention;

FIG. 5 is a graph illustrating the result of thermodynamic calculation of the formation of a chromium nitride according to the temperature and nitrogen partial pressure;

FIG. 6 is a graph illustrating the result of thermodynamic calculation on the conversion of chromium nitride into a different type of chromium nitride according to temperature and nitrogen partial pressure;

FIG. 7 is a graph illustrating the result of thermodynamic calculation on the formation of chromium nitrides according to the temperature and mixed gas partial pressure;

FIG. 8 is a graph illustrating the X-ray diffraction (XRD) results according to the embodiment of the present invention;

FIG. 9 is a graph illustrating the result of a potentiodynamic polarization test according to the embodiment of the present invention; and FIG. 10 is a graph illustrating the result of the measurement of interfacial contact resistance according to the embodiment of the present invention.

BEST MODE FOR CARRYING OUT THE INVENTION

The present invention will now be described in more detail with the reference to the accompanying drawings, in which exemplary embodiments of the invention are shown.

FIG. 2 illustrates a photographic image showing a cross-section of a separator, in which conventional nickel strike, nickel and chromium are sequentially plated on the surface of stainless steel. FIG. 3 illustrates a photographic image showing a cross-section of a separator in which nickel strike and chromium are sequentially plated on the surface of stainless steel according to the present invention. FIG. 4 illustrates a photographic image showing a cross-section of a separator, in which chromium was plated and nitrided on the surface of stainless steel.

A metallic separator for a fuel cell according to the present invention has a structure in which a chromium nitride layer is formed on the surface of a chromium plated base metal. In order to form such a chromium nitride layer, firstly, chromium is plated on the surface of the base metal and the chromium plated layer is nitrided to form a chromium nitride layer.

Since a very stable passive film is formed on the surface of stainless steel, it is difficult to plate chromium directly on the surface of stainless steels. The passive film should be removed through nickel strike and, simultaneously, nickel is plated to a small thickness on the surface of the stainless steel. Subsequently, nickel may be firstly plated as an underlying metal on the surface of the stainless steel and chromium may be again plated on the nickel.

Firstly, as illustrated in FIG. 2, nickel strike is performed on the surface of the stainless steel, plating of nickel to a predetermined thickness as underlying plating is performed on the nickel strike layer, and chromium plating is again performed on the nickel-plated layer. However, when nickel plating is performed on the nickel strike layer, many defects can form at a boundary between the chromium-plated layer and the nickel-plated layer due to the poor throwing power of chromium plating, as illustrated in FIG. 2. These defects can adversely affect the physical and electrochemical properties of the separator.

In the present invention, as illustrated in FIG. 3, after the nickel strike is performed on the surface of the stainless steel, chromium plating is performed directly on the nickel strike layer. Defects were hardly observed at the boundary between the chromium-plated layer and the nickel strike layer.

Here, the nickel strike is a method by which a passive film on the surface of the stainless steel is removed using hydrochloric acid and, simultaneously, nickel is plated on the surface of the stainless steel to a very small thickness. In this manner, it is very easy to plate chromium on the nickel strike layer plated on the surface of the stainless steel to a small thickness.

After nickel strike is performed on the surface of the stainless steel, which is a base metal, chromium is plated on the nickel strike layer and the chromium-plated layer is nitrided using a nitrogen gas. By this method, very stable chromium nitride layer can be formed on the surface of the chromium plated stainless steel, as illustrated in FIG. 4.

In the present embodiment, stainless steel is used as a base metal. However, other metals such as carbon steels, chromium steels or nonferrous alloys such as aluminum or copper alloys may be used as the base metal. When a metal is used as the base metal, chromium plating can be performed directly on the surface of the base metal. If a passive oxide film exists on the metal surface as in the case of stainless steel, nickel strike is firstly performed, as described above, and then, chromium plating should be performed. In the case of nonmetallic material such as plastics, nickel strike can also firstly be performed on the plate, and then, chromium plating will be possible on the nickel layer as described above.

In the metallic separator according to the present invention, since the chromium nitride layer formed on the surface of the base metal has a very stable structure and high corrosion resistance, low-priced metals or alloys may be used for the base metal plate. However, for the possible presence of defects in chromium nitride layer, stainless steel having a high corrosion resistance is preferred as the base metal.

When chromium is nitrided, two types of chromium nitrides, CrN and $Cr_2N$, can be formed under conventional nitriding conditions. Accordingly, when a chromium nitride layer is formed by the nitriding of the chromium plating on the surface of the base metal, a chromium nitride of CrN or $Cr_2N$ could form according to the nitriding chromium layer, CrN is firstly formed on the surface of the chromium plate layer. Below the CrN layer, the concentration of nitrogen is low and $Cr_2N$ is grown into the chromium plate layer and also into the base metal.

Even though, the CrN and $Cr_2N$ do not show large difference in corrosion resistance, the electrical resistivity of CrN is 10 times larger than that of $Cr_2N$. By forming $Cr_2N$ only on the surface of the base metal, the efficiency of the fuel cell can be improved by reducing ICR. The metallic separator for a fuel cell according to the present invention may have only $Cr_2N$ on the surface of the base metal.

FIG. 5 illustrates a result of thermodynamic calculation on the formation of a chromium nitride according to the present invention.

A reaction that chromium combines with nitrogen may be classified into the following equations:

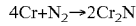

$$4Cr+N_2 \rightarrow 2Cr_2N$$

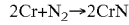

$$2Cr+N_2 \rightarrow 2CrN$$

A reaction to form a chromium nitride reduces the Gibbs free energy of the system. FIG. 5 shows the nitriding conditions of the reaction to form only $Cr_2N$.

As illustrated in FIG. 5, when the nitrogen partial pressure is 5 atm, the nitriding reaction to form $Cr_2N$ is stable at above 1533K (1260° C.). If the chromium plate layer is nitrided at above this temperature, only the $Cr_2N$ layer can form on the surface of the separator. When the nitrogen partial pressure is 0.5 atm, the nitriding reaction to form $Cr_2N$ is stable at above 1345K (1072° C.). When the nitrogen partial pressure is reduced to 0.001 atm, $Cr_2N$ can be formed at above 1004K (731° C.).

However, the $Cr_2N$ layer on the surface of the separator can react with nitrogen and be converted into CrN during cooling after nitridization.

This reaction is as follows:

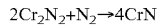

$$2Cr_2N+N_2 \rightarrow 4CrN$$

FIG. 6 illustrates the result of thermodynamic calculation with respect to the above reaction.

The result shows that the reaction of $Cr_2N$ with nitrogen to form CrN is favorable at lower temperatures, and $Cr_2N$ may be converted into CrN during cooling after nitriding treatment.

However, the conversion of $Cr_2N$ to CrN by the reaction with nitrogen is not a fast process. The formation of CrN can be prevented when the separator is cooled at a very fast cooling rate or the supply of nitrogen is terminated during cooling. Therefore, in order to prevent $Cr_2N$ from converting to CrN, the cooling must be performed under the following conditions:

(1) The cooling should be last such that it takes less than 2 hours from nitridization temperature to room temperature; or (2) The supply off nitrogen is terminated and Argon gas is supplied.

When a mixed gas of nitrogen and hydrogen is used, the nitriding reaction occurs as follows:

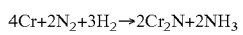

$$4Cr+2N_2+3H_2 \rightarrow 2Cr_2N+2NH_3$$

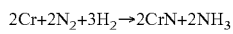

$$2Cr+2N_2+3H_2 \rightarrow 2CrN+2NH_3$$

When the nitridization is performed using a mixed gas, a reductive atmosphere is maintained and the oxygen partial pressure can be minimized in the furnace. As illustrated in FIG. 7, when a partial pressure of the mixed gas is 5 atm, $Cr_2N$ can form at above 936K (663° C.). When the partial pressure of the mixed gas is reduced to 0.5 atm, the temperature that can form $Cr_2N$ can be reduced to 787K (514° C.). When the partial pressure of the mixture gas is reduced to 0.001 atm, the reaction to form $Cr_2N$ is stable at above 557K (294° C.).

If the pressure of the nitriding gas is too low, lower than 0.001 atm, the concentration of nitrogen will be very low and a nitriding time will be too long for the efficient production. When the nitriding gas pressure is too high, higher than 5 atm, additional high pressure equipments should be needed and the nitriding temperature for $Cr_2N$ layer will be too high and the process control will be difficult.

As illustrated in FIG. 3, when conventional chromium plating is performed on the surface of the base metal (stainless steel in a photo), cracks may develop in the chromium-plated layer. The cracks can cause crevice corrosion and corrosion resistance of the plate can be degraded. However, when the chromium-plated layer is nitrided as in the present invention, the cracks are filled with the growth of chromium nitride, as illustrated in FIG. 4. In other words, the cracks in the chromium-plated layer can be removed by nitridization and the corrosion resistance of the plate can be improved.

The metallic separator for a fuel cell according to the exemplary embodiment of the present invention will now be described through the experiment results.

FIG. 8 illustrates the X-ray diffraction (XRD) result according to the embodiment of the present invention, and FIGS. 9 and 10 illustrate the results of potentiodynamic polarization and interfacial contact resistance measurements according to the embodiment of the present invention.

In the present embodiment, AISI316L stainless steel is used as the base metal, and nickel strike is performed on the stainless steel. Subsequently, chromium is plated to a thickness of 10 μm on the nickel strike layer and nitridization is performed on the chromium plated base metal, using a nitrogen gas, as illustrated in FIG. 3. Nitridization is performed for two hours at 1100° C. under a nitrogen partial pressure of 0.1 atm. As a result, a uniform and compact chromium nitride layer is formed on the plate, as illustrated in FIG. 4.

And, as illustrated in FIG. 8, x-ray diffraction result of the chromium nitride layer shows only the diffraction peaks of $Cr_2N$ chromium nitride. That proves only the $Cr_2N$ chromium nitride layer is formed at the surface of the specimen. Cracks in the chromium-plated layer are removed.

FIG. 9 shows the result of potentiodynamic polarization tests on the separator produced by the present method. Corrosion current density is about $10^{-6}$ A/cm$^2$ between −0.1 volts and 0.6 volts, which is the operating voltage of PEMFC. The potentiodynamic polarization test was performed in one mole of sulfuric acid solution at 80° C., which is similar to a corrosive environment inside the fuel cell stack.

FIG. 10 shows the result of the measurement of ICR (interfacial contact resistance) on the separator produced by present method. ICR is reduced by about 50% of the ICR value of the stainless steel. This low value of ICR is expected from the Cr$_2$N layer formed at the surface of the base metal.

INDUSTRIAL APPLICABILITY

In the metallic separator fof fuel cell that produced according to the present invention has only CrN nitride layer on the surface of a base metal. Cr$_2$N nitride, which has lower electrical resistivity than CrN nitride, is selectively formed by controlling the nitriding condition to reduce the contact resistivity of the separator and so to improve the efficiency of the fuel cell.

In addition, according to the present invention, a low-priced general metal, such as stainless steel or carbon steel, instead of high chromium alloy, is used as base metal and the cost to fabricate the separator can be significantly reduced.

In addition, according to the present invention, cracks existing in the chromium coating layer can be removed during nitriding treatment.

In addition, according to the present invention, since the thickness of the separator can be reduced as small as to 0.2 mm, the weight and total thickness of the fuel cell stack can be significantly reduced.

The invention claimed is:

1. A method of fabricating a metallic separator for fuel cell in which a Cr$_2$N nitride layer is formed on the surface of a base metal, comprising:

plating chromium on the surface of the base metal to form a chromium-plated layer;

forming Cr$_2$N layer by nitriding the chromium-plated layer; and cooling of the metallic separator wherein the cooling takes less than 2 hours from nitridization temperature to room temperature so that CrN nitride is not generated during the cooling step after said forming.

2. The method of claim 1, further comprising nickel striking before the step of plating of chromium on the surface of the base metal, wherein the base metal has a passive oxide film on it.

3. The method of claim 1, wherein the partial pressure of nitrogen is set to 0.001-5 atm during the nitriding treatment.

4. The method of claim 1, wherein the partial pressure of the mixed gas of nitrogen and hydrogen is set to 0.001-5 atm during the nitriding treatment.

5. The method of claim 1, wherein supply of nitrogen is terminated and Argon gas is supplied during the cooling step so that CrN nitride is not generated during the cooling step after nitridization.

6. The method of claim 2, wherein the partial pressure of nitrogen is set to 0.001-5 atm during the nitriding treatment.

7. The method of claim 2, wherein the partial pressure of the mixed gas of nitrogen and hydrogen is set to 0.001-5 atm during the nitriding treatment.

8. The method of claim 2, wherein supply of nitrogen is terminated and Argon gas is supplied during the cooling step so that CrN nitride is not generated during the cooling step after nitridization.

* * * * *

UNITED STATES PATENT AND TRADEMARK OFFICE
CERTIFICATE OF CORRECTION

PATENT NO.        : 8,124,298 B2
APPLICATION NO.   : 11/996691
DATED             : February 28, 2012
INVENTOR(S)       : Dae Geun Nam et al.

It is certified that error appears in the above-identified patent and that said Letters Patent is hereby corrected as shown below:

Column 1, line 42, replace "power source fix automobiles" with --power source for automobiles--.

Column 1, line 46, replace "electromotive fierce" with --electromotive force--.

Column 1, line 50, replace "advantages ci fuel cells" with --advantages of fuel cells--.

Column 6, line 10, replace "supply off nitrogen" with --supply of nitrogen--.

Column 7, line 14, replace "In the metallic separator fof fuel cell" with --In the metallic separator for fuel cell--.

Signed and Sealed this
Twenty-ninth Day of May, 2012

David J. Kappos
*Director of the United States Patent and Trademark Office*